United States Patent
Weber et al.

(10) Patent No.: US 11,564,351 B2
(45) Date of Patent: Jan. 31, 2023

(54) LAWN STRIPING MECHANISM

(71) Applicant: Reliable Production Machining & Welding, Kendallville, IN (US)

(72) Inventors: Clay C. Weber, LaOtto, IN (US); Lucas C. Drerup, Kendallville, IN (US)

(73) Assignee: Reliable Production Machining & Welding, Kendallville, IN (US)

( * ) Notice: Subject to any disclaimer, the term of this patent is extended or adjusted under 35 U.S.C. 154(b) by 435 days.

(21) Appl. No.: 16/787,813

(22) Filed: Feb. 11, 2020

(65) Prior Publication Data
US 2021/0243952 A1    Aug. 12, 2021

(51) Int. Cl.
*A01D 43/00*   (2006.01)
*A01D 101/00*  (2006.01)
*A01D 34/64*   (2006.01)

(52) U.S. Cl.
CPC ............ *A01D 43/006* (2013.01); *A01D 34/64* (2013.01); *A01D 2101/00* (2013.01)

(58) Field of Classification Search
CPC ... A01D 43/006; A01D 34/64; A01D 2101/00
USPC ........................................................ 56/16.7
See application file for complete search history.

(56) References Cited

U.S. PATENT DOCUMENTS

| | | | | |
|---|---|---|---|---|
| 5,623,996 | A * | 4/1997 | Postema | A01D 42/04 56/320.1 |
| 6,003,611 | A * | 12/1999 | Martinez | A01D 34/84 172/15 |
| 6,082,082 | A * | 7/2000 | Hunter | A01D 34/58 56/11.9 |
| 7,237,374 | B2 * | 7/2007 | Sugden | A01D 43/00 56/249 |
| 8,112,976 | B1 * | 2/2012 | Kallevig | A01D 43/00 56/16.7 |
| 2006/0288683 | A1 * | 12/2006 | Sugden | A01D 34/001 56/16.7 |
| 2010/0192533 | A1 * | 8/2010 | Coleman | A01D 34/54 56/15.8 |
| 2020/0077581 | A1 * | 3/2020 | Carter | A01D 34/74 |
| 2020/0214211 | A1 * | 7/2020 | Ki | A01D 75/185 |
| 2022/0022386 | A1 * | 1/2022 | Danling | A01G 20/30 |

* cited by examiner

*Primary Examiner* — Toan C To
(74) *Attorney, Agent, or Firm* — Taylor IP, P.C.

(57) ABSTRACT

A lawn care device including a mobile support apparatus, a grass cutting mechanism coupled to the mobile support apparatus and a lawn striping device coupled to the mobile support apparatus. The lawn striping device has a grass contacting member and at least one torsional restraining device coupled to the mobile support apparatus. The torsional restraining device is coupled to the grass contacting member. The torsional restraining device allowing a restrained pivoting of the grass contacting member relative to the mobile support apparatus.

17 Claims, 4 Drawing Sheets

LAWN STRIPING MECHANISM

BACKGROUND OF THE INVENTION

1. Field of the Invention

The present invention relates to lawn mower attachments, and, more particularly, to a striping mechanism coupled to a lawn mower.

2. Description of the Related Art

Grass or lawn striping is a grass grooming procedure used to orient the blades of grass to achieve an aesthetic effect. For example, striping is used in professional ballparks to create a grass surface having a checkerboard or plaid pattern. Golf courses, municipal parks, and, many homeowners are also incorporating striping techniques into their lawn care portfolio.

The striping effect is achieved by bending blades of grass in a desired orientation. For example, when grass is bent away from an observer the blades of grass appear lighter than when the blades are bent towards the observer. It is common for a first strip of grass is bent in a first direction, while an immediately adjacent strip is bent in the opposite direction. This back and forth pattern is repeated across an entire lawn in order to achieve the desired effect.

One way to accomplish the striping is to use a roller to roll the grass, which can take place during the mowing operation. In this configuration the roller is attached to a rear portion of a mower such that it rolls over the grass, bending the blades of grass in the direction of travel. Reel mowers often include a roller fixed to a rear side of each mower reel. Other mower configurations can include full width, rear-mounted rollers.

While these striping systems are effective, problems remain. For example, pulled rollers are often heavy and other types of rollers are rigidly fixed to the mower or cutting deck to ensure sufficient downward force is applied to produce the desired striping effect. However, heavy or full-width rollers, or those rigidly affixed to the vehicle, may inadvertently strike ground surfaces or obstacles, such as curbs, during operation, resulting in potential damage to the lawn surface and/or the roller. Prior-art striping mechanisms often lack adjustability, in that they typically apply their full force or weight to the ground regardless of particular grass conditions, such as the grass height. To alter the downward pressure of the prior art striping mechanism often requires its removal from the mower or, alternatively, loosening and repositioning of the striping mechanism, typically with the use of tools.

What is needed in the art is an easily adjustable and resilient striping system.

SUMMARY OF THE INVENTION

The present invention provides a torsionally restrained lawn striping system.

The invention in one form is directed to a lawn care device including a mobile support apparatus, a grass cutting mechanism coupled to the mobile support apparatus and a lawn striping device coupled to the mobile support apparatus. The lawn striping device has a grass contacting member and at least one torsional restraining device coupled to the mobile support apparatus. The torsional restraining device is coupled to the grass contacting member. The torsional restraining device allowing a restrained pivoting of the grass contacting member relative to the mobile support apparatus.

The invention in another form is directed to a lawn striping device couplable to a mobile support apparatus. The lawn striping device having a grass contacting member and at least one torsional restraining device coupled to the mobile support apparatus. The torsional restraining device is coupled to the grass contacting member. The torsional restraining device allowing a restrained pivoting of the grass contacting member relative to the mobile support apparatus.

An advantage of the present invention is that the striping device is easily installed and maintained.

Another advantage is the striping system provides for a movement of the grass roller, while maintaining a downward pressure.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention, in one form, and such exemplification is not to be construed as limiting the scope of the invention in any manner.

DETAILED DESCRIPTION OF THE INVENTION

Figure 1:
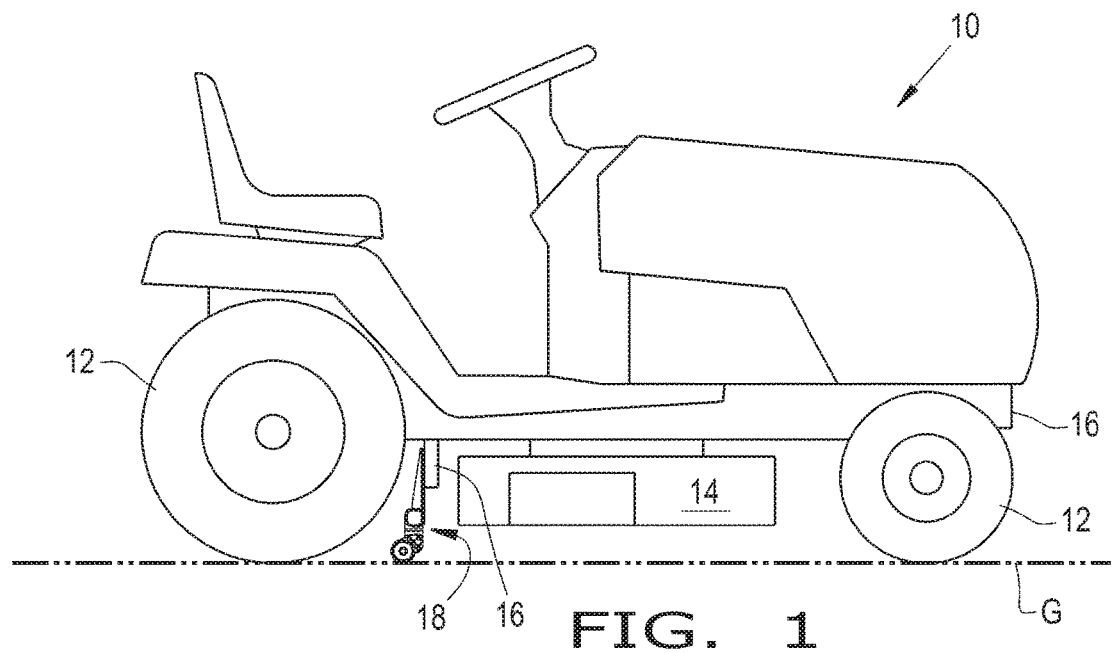
FIG. 1 is a side view of a lawn mower with an embodiment of a lawn striper of the present invention.

Referring now to the drawings, and more particularly to FIG. 1, there is shown a lawn mower 10, which can be more generally referred to as a lawn care device 10 which generally includes wheels 12, and an attached mower deck 14. Wheels 12 are shown in contact with ground G. Mower deck 14 can more generally be called a grass cutting mechanism 14. Lawn care device 10 has a mobile support apparatus 16, which is a frame 16 in this specific example. Attached to mobile support apparatus 16 is a lawn striping device 18.

Figure 2:
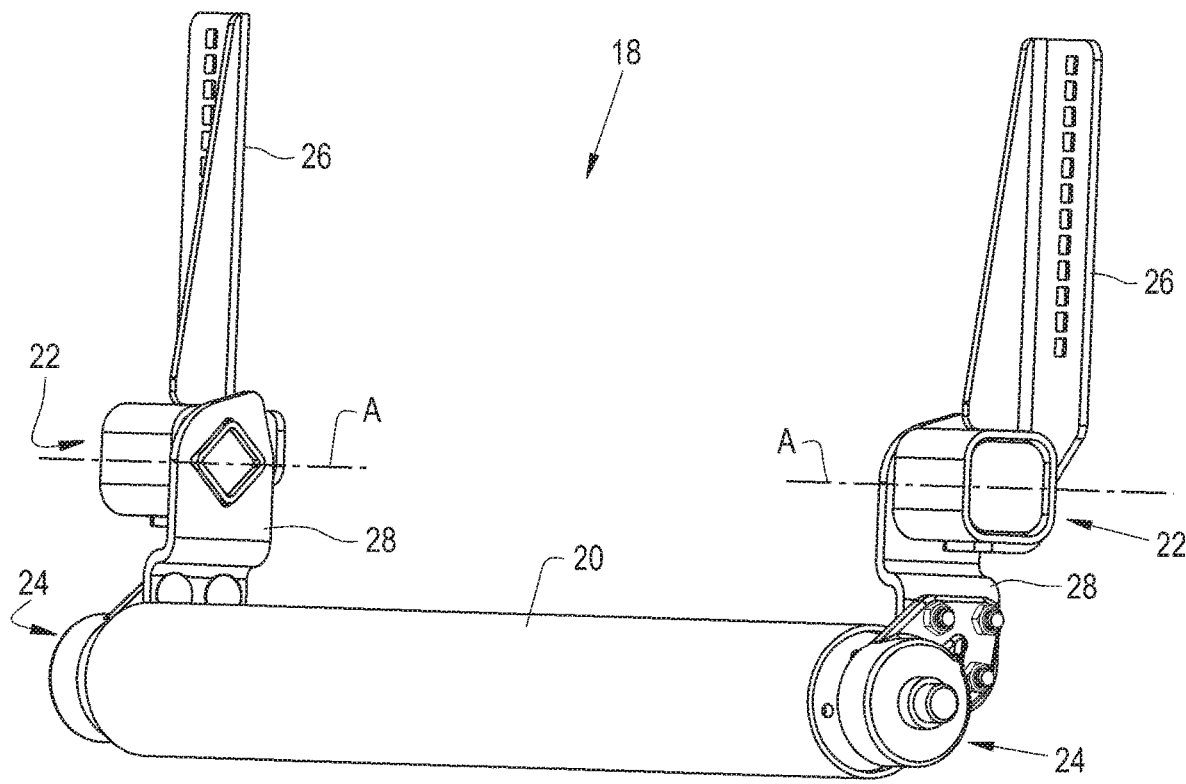
FIG. 2 is a perspective view of the lawn striper of FIG. 1.

Now, additionally referring to FIG. 2, lawn striping device 18 includes a grass contacting member 20 and at least one torsional restraining device 22 coupled to mobile support apparatus 16. Torsional restraining device 22 is coupled to grass contacting member 20 by way of bearing arrangements 24. Torsional restraining device 22 has arms 26 and 28, with arm 26 being connected to mobile support apparatus 16 and arm 28 being connected to bearing arrangements 24. Torsional restraining device 22 allows a restrained pivoting of grass contacting member 20 relative to mobile support apparatus 16 about an axis A. Torsional restraining devices 22 are mirror images of each other, while each provide for the restrained pivoting about axis A.

Figure 3:
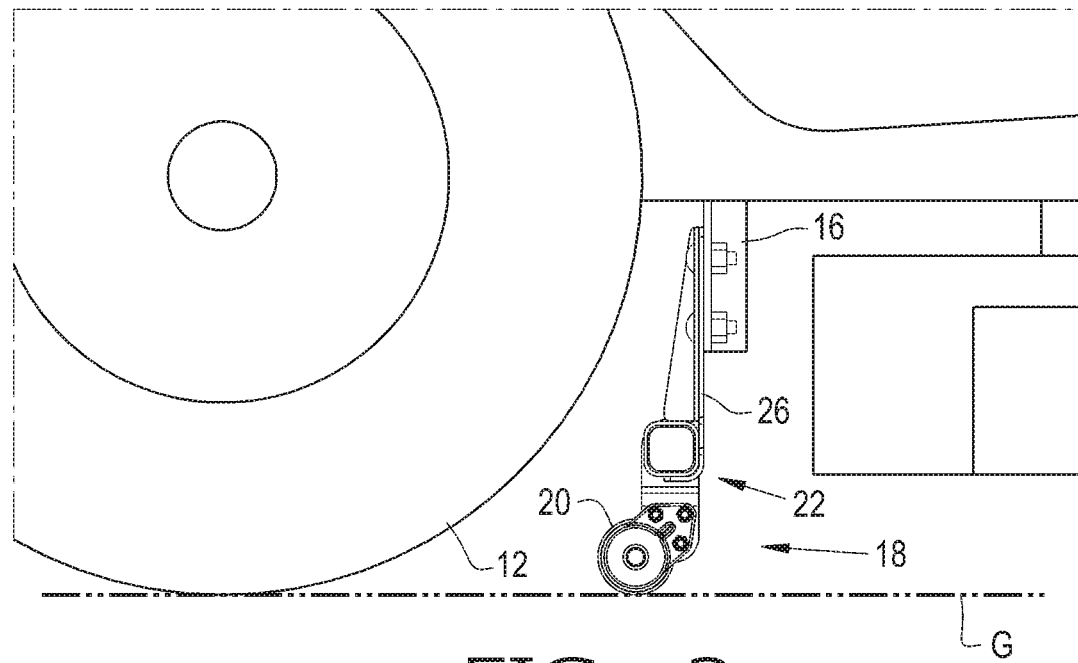
FIG. 3 is an enhanced side view of the lawn mower of FIG. 1, showing more detail of the mounting of the lawn striper of FIGS. 1 and 2.
Figure 4:
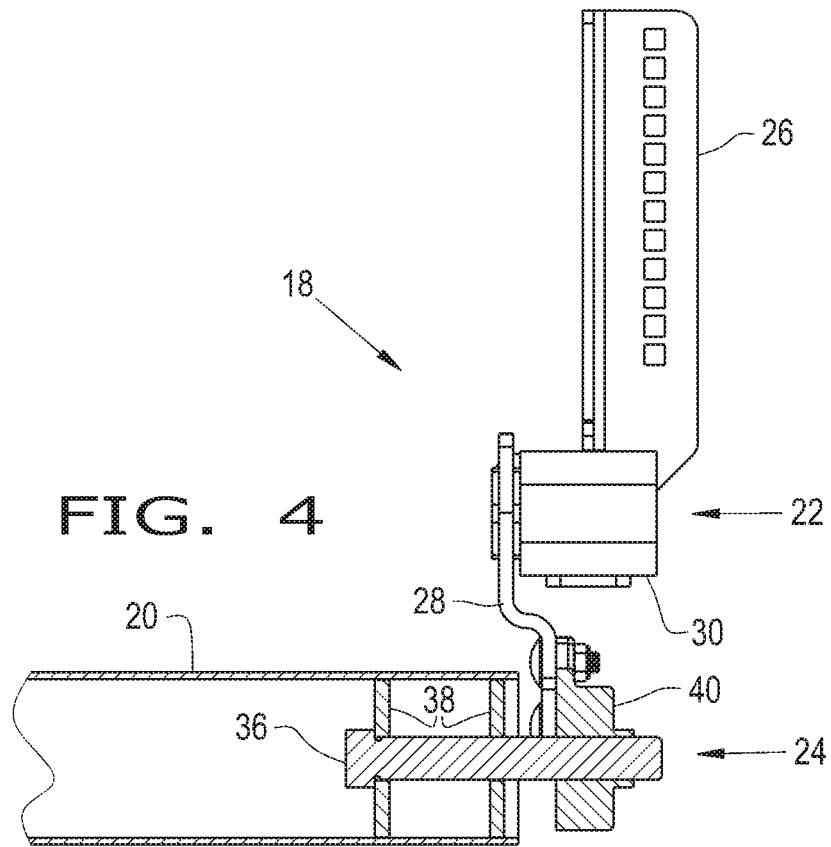
FIG. 4 is a partially sectioned rear view of the lawn striper of FIGS. 1-3.
Figure 5:
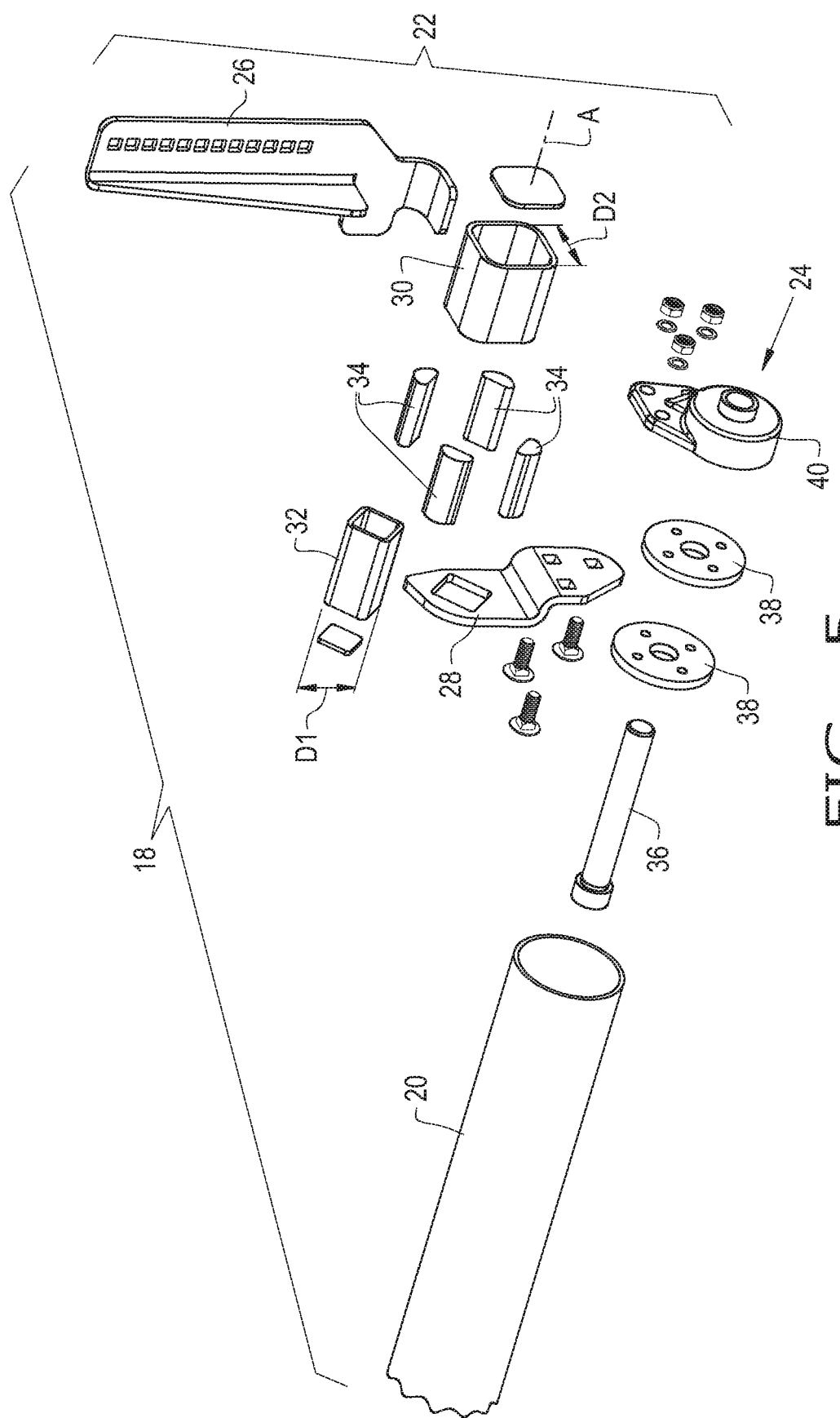
FIG. 5 is an exploded view of one end of the lawn striper of FIGS. 1-4.

Now, additionally referring to FIGS. 3-5, torsional restraining devices 22 are coupled to each end of grass contacting member 20, and each torsional restraining device includes an outer structural member 30 and an inner structural member 32. As can be seen in FIG. 5, there are resilient members 34 positioned between outer structural member 30 and inner structural member 32. Resilient members 34 may be made of a synthetic or natural material that have inherent resilient characteristics that do allow pivoting about axis A, but are resistant to the pivoting and act to return grass contacting member 20 to a "centered" position. Resilient members 34 work in both directions in that when an external force is place on grass contacting member 20 they resiliently provide a resistance to the amount of pivoting.

As can be seen, an outer portion of inner structural member 32 and an inner portion of outer structural member 30 have the same number of flat sides. Member 32 is positioned in member 30 with resilient members 34 being positioned therebetween. The outer portion of inner structural member 32 and the inner portion of outer structural member 30 even though having similar shape, the size of member 32 is smaller. Further member 32 is arranged to be oriented so that the flat sides are oriented toward the corners of member 30 when inserted therein.

Resilient members 34 are shaped and positioned to fit against a flat side of the outer portion of inner structural member 32 and in a corner of the inner portion of outer structural member 30. Resilient members 34 are uniformly positioned so that inner member 32 will stay centrally positioned within member 30. Outer structural member 30 has a substantially square shaped interior cross section and inner structural member 32 has a substantially square shaped exterior cross section. Inner structural member 32 has a diagonal dimension D1 that is less than a distance D2 from one flat side of the interior of the outer structural member to an opposite flat side.

In FIGS. 4 and 5 bearing arrangement 24 is further illustrated, with the arrangement 24 on the opposite end of grass contacting member 20 being a mirror view of the one shown. Here bearing arrangement 24 includes a shaft 36, interior supports 38 and bearing 40. Shaft 36 is positioned and restrained by spaced apart supports 38, with bearing 40 allowing grass contacting member 20 to rotate as lawn care device 10 traverses ground G. The arrangement allows bearing 40 to be pushed over shaft 36 and member 32 to be inserted in member 30 along with members 34 during installation if desired, allowing for ease of shipping, installation and maintenance. Holes in arm 26 allow for a selectable installation of lawn striping device 18 relative to mobile support apparatus 16. It is also contemplated that lawn striping device 18 may be connected to deck 14, but the preferred installation is to support 16.

Figure 6:
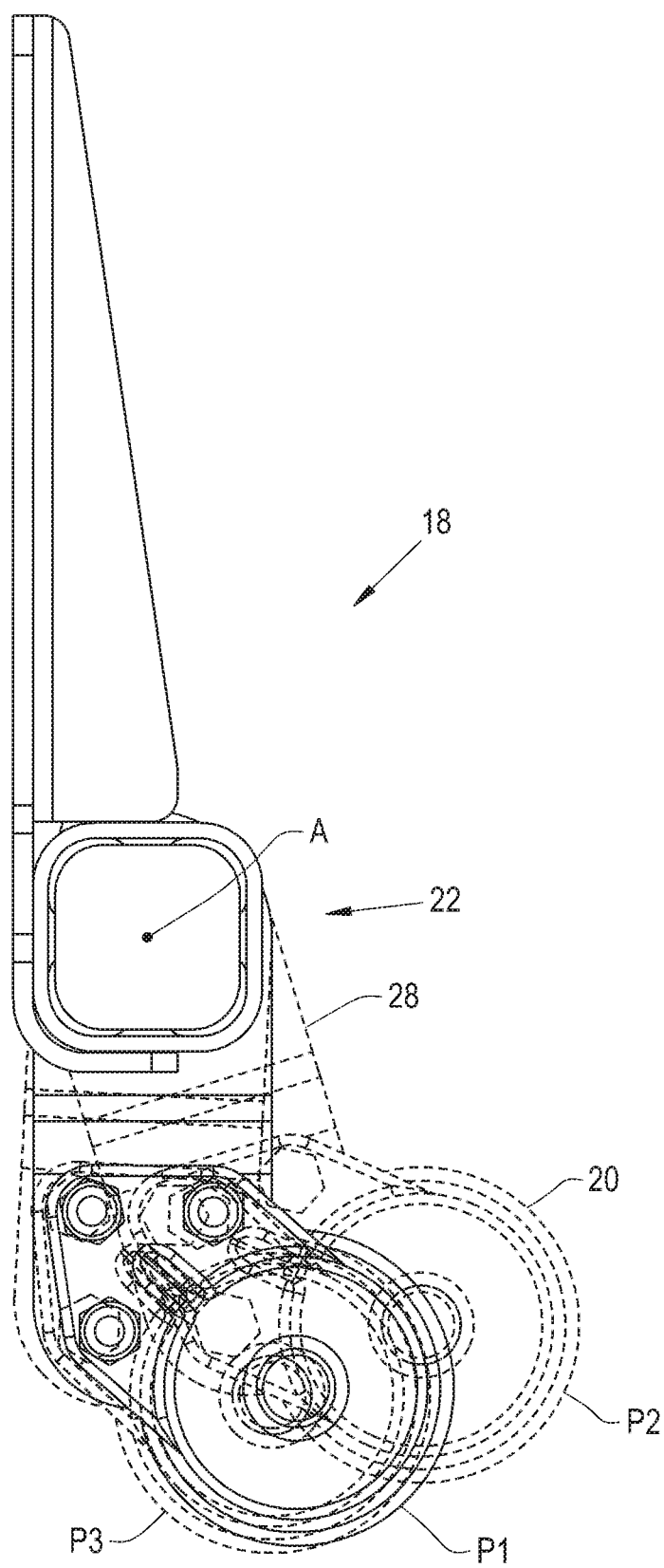
FIG. 6, illustrates movement of the lawn striper of FIGS. 1-5 as the lawn mower moves.

Now, additionally referring to FIG. 6, there is shown a left side view of lawn striping device 18 with the lower part of torsional restraining device 22 reacting to movement of lawn care device 10. Here positions P1, P2 and P3 are illustrated. Position P1 can be considered an at rest position, where mower 10 is not moving. As mower 10 moves forward the forward motion of mower 10 causes lateral force to cause torsional restraining device 22 to pivot about axis A moving to position P2. When mower 10 moves in a reverse direction, presumably at a lower speed than in the forward direction, then torsional restraining device 22 pivots to position P3.

Advantageously the present invention provides a striping effect to the lawn as it is being mowed and allows for a economic installation that moderates the applied force due to the torsional restraint of the inventive solution.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A lawn care device, comprising:
   a mobile support apparatus;
   a grass cutting mechanism coupled to the mobile support apparatus; and
   a lawn striping device coupled to the mobile support apparatus, the lawn striping device including:
   a grass contacting member; and
   at least one torsional restraining device coupled to the mobile support apparatus, the torsional restraining device being coupled to the grass contacting member, the torsional restraining device allowing a restrained pivoting of the grass contacting member relative to the mobile support apparatus, wherein the at least one torsional restraining device further includes:
   an outer structural member;
   an inner structural member;
   a first arm coupled to the outer structural member; and
   a second arm coupled to the inner structural member.

2. The lawn care device of claim 1, wherein the at least one torsional restraining device is a plurality of torsional restraining devices, including a first torsional restraining device and a second torsional restraining device, the first torsional restraining device being coupled to one end of the grass contacting member and the second torsional restraining device being coupled to an other end of the grass contacting member.

3. The lawn care device of claim 2, wherein each torsional restraining device further includes:
   a plurality of resilient members positioned between the outer structural member and the inner structural member.

4. The lawn care device of claim 3, wherein an outer portion of the inner structural member and an inner portion of the outer structural member have the same number of flat sides, the plurality of resilient members being positioned between the outer portion of the inner structural member and the inner portion of outer structural member.

5. The lawn care device of claim 4, wherein each of the plurality of resilient members are shaped and positioned to fit against a flat side of the outer portion of the inner structural member and in a corner of the inner portion of the outer structural member.

6. The lawn care device of claim 5, wherein the outer structural member has a substantially square shaped interior cross section and the inner structural member has a substantially square shaped exterior cross section.

7. The lawn care device of claim 6, wherein the inner structural member has a diagonal dimension that is less than a distance from one flat side of the interior of the outer structural member to an opposite flat side.

8. A lawn care device, comprising:
   a mobile support apparatus;
   a grass cutting mechanism coupled to the mobile support apparatus; and a lawn striping device coupled to the mobile support apparatus, the lawn striping device including:
a grass contacting member; and
at least one torsional restraining device coupled to the mobile support apparatus, the torsional restraining device being coupled to the grass contacting member, the torsional restraining device allowing a restrained pivoting of the grass contacting member relative to the mobile support apparatus, wherein the at least one torsional restraining device is a plurality of torsional restraining devices, including a first torsional restraining device and a second torsional restraining device, the first torsional restraining device being coupled to one end of the grass contacting member and the second torsional restraining device being coupled to an other end of the grass contacting member, wherein each torsional restraining device includes:
an outer structural member;
an inner structural member; and
a plurality of resilient members positioned between the outer structural member and the inner structural member, wherein the torsional restraining device further includes:
a first arm coupled to the outer structural member; and
a second arm coupled to the inner structural member.

9. The lawn care device of claim 8, wherein one of the first arm and the second arm is connected to the mobile support apparatus.

10. The lawn care device of claim 8, wherein the lawn striping device further includes first and second bearing arrangements, the first bearing arraignment being coupled to the second arm of the first torsional restraining device, the second bearing arraignment being coupled to the second arm of the second torsional restraining device, the first and second bearing arrangements being coupled to opposite ends of the grass contacting member.

11. A lawn striping device couplable to a lawn care device having a mobile support apparatus, the lawn striping device including:
a grass contacting member; and
at least one torsional restraining device couplable to the mobile support apparatus, the torsional restraining device being coupled to the grass contacting member, the torsional restraining device allowing a restrained pivoting of the grass contacting member relative to the mobile support apparatus, wherein the at least one torsional restraining device is a plurality of torsional restraining devices, including a first torsional restraining device and a second torsional restraining device, the first torsional restraining device being coupled to one end of the grass contacting member and the second torsional restraining device being coupled to an other end of the grass contacting member, wherein each torsional restraining device includes:
an outer structural member;
an inner structural member; and
a plurality of resilient members positioned between the outer structural member and the inner structural member, wherein the torsional restraining device further includes:
a first arm coupled to the outer structural member; and
a second arm coupled to the inner structural member.

12. The lawn striping device of claim 11, wherein one of the first arm and the second arm is connectable to the mobile support apparatus.

13. The lawn striping device of claim 11, further comprising first and second bearing arrangements, the first bearing arraignment being coupled to the second arm of the first torsional restraining device, the second bearing arraignment being coupled to the second arm of the second torsional restraining device, the first and second bearing arrangements being coupled to opposite ends of the grass contacting member.

14. The lawn striping device of claim 11, wherein an outer portion of the inner structural member and an inner portion of the outer structural member have the same number of flat sides, the plurality of resilient members being positioned between the outer portion of the inner structural member and the inner portion of outer structural member.

15. The lawn striping device of claim 14, wherein each of the plurality of resilient members are shaped and positioned to fit against a flat side of the outer portion of the inner structural member and in a corner of the inner portion of the outer structural member.

16. The lawn striping device of claim 15, wherein the outer structural member has a substantially square shaped interior cross section and the inner structural member has a substantially square shaped exterior cross section.

17. The lawn striping device of claim 16, wherein the inner structural member has a diagonal dimension that is less than a distance from one flat side of the interior of the outer structural member to an opposite flat side.

* * * * *